Patented Mar. 21, 1950

2,501,400

UNITED STATES PATENT OFFICE 2,501,400

METHOD OF FOOD PREPARATION

Laurence K. Marshall, Cambridge, Mass., assignor to Raytheon Manufacturing Company, Newton, Mass., a corporation of Delaware No Drawing. Application December 27, 1949, Serial No. 135,300

11 Claims. (Cl. 99—221)

This is a continuation-in-part of my copending application, Serial No. 725,719, filed January 31, 1947 now abandoned.

This invention relates to a method of preparing food, and more particularly to a method of preparing for consumption, on a commercial scale, individual portions of cooked food or complete individual cooked meals, from raw food stuffs in bulk.

An object of this invention is to devise a method for preparing food, by means of which individual meals may be maintained in storage for any desired length of time, or even indefinitely, without spoilage, yet may be prepared for consumption when desired in a very short time.

Another object is to devise a very efficient and economical method of preparing or cooking individual portions of food on a commercial basis.

Essentially, this invention accomplishes the foregoing and other objects by the steps of precooking the raw foodstuff to a desired degree, cooling the precooked foodstuff to a preservation temperature and maintaining the preservation temperature for as long as is necessary, and heating the preserved precooked foodstuff to an eating temperature with microwave energy.

The foregoing and other objects of the invention will be best understood as the description proceeds.

The first step in my method of food preparation is to cook each different kind of raw foodstuff separately in large quantities or in bulk, a step which may be termed precooking (that is, cooking a substantial time before serving) of the food. Each different kind of foodstuff is cooked in a manner and for a time appropriate thereto. By reason of the fact that the foodstuff is cooked in large quantities, the cooking process is rather inexpensive.

The next step is to separate each mass of cooked foodstuff into individual portions, which may be done by a weighing procedure or by any other suitable procedure. Following this, each individual portion of precooked food is packed into a separate container or mold and is cooled to a temperature at which it will remain preserved for a desired length of time. If preservation for not more than a few days is required, then refrigeration to a temperature of or somewhat above 32 degrees Fahrenheit is satisfactory. Where the precooked food is to be kept or stored for long periods of time, it is frozen by a so-called "deep freeze" or "quick freeze" process, in which the material is frozen so rapidly as to inhibit the growth of any substantial number of bacteria therein. Each mold may have any desired configuration, for example a configuration such that a body frozen in the mold will have the shape of a prism, specifically a rectangular prism or rectangular parallelopiped. Therefore, when the precooked food is frozen, at the end of the freezing step, each body may be removed from its mold, and it will be an individual precooked frozen food patty.

It is desired to make clear at this point that when the freezing is employed for long-term preservation, the time elapsing between the completion of the precooking step and the completion of the freezing step should be held to an absolute minimum to minimize the growth of harmful bacteria.

The above-described steps may be carried out with any food which is intended to be cooked before eating. In some cases the individual precooked food portions, such as the frozen food patties, are each wrapped or packaged in a suitable material, for example, any of the conventional commercial transparent packaging materials. Such a procedure is utilized in cases where a greater variety of meals is desired, because almost an infinite variety of meals may be assembled by judicious selection and grouping of food patties of different kinds.

In the more usual case, however, for the next step precooked food portions of different kinds, for example, one meat portion and two unlike vegetable portions, are selected, assembled in a sectional container or dish as a complete meal, and then suitably packaged, for example in a cardboard box which is wrapped in sheet material, such as waxed paper. Such a precooked and preserved food meal is held in storage at a suitable preservation temperature until used. For long-term preservation, a temperature on the order of 0 degrees Fahrenheit is suitable, and if this temperature is maintained, food frozen as set forth above may be kept indefinitely without danger of spoilage.

In order for my method to be effective, a complete preserved food meal must be heated to a temperature suitable for eating in a time on the order of two minutes. This requirement is necessary in order to save time in the preparation or cooking of individual meals on a commercial scale. When the food has been preserved by freezing, this requires that the complete frozen meal must be both thawed and heated to an eating temperature in about two minutes. Such very short thawing and heating times are possible only with the use of a microwave energy heating apparatus, the term "microwave energy" as used herein referring to electromagnetic energy having a wave length of the order of thirty centimeters or less. A microwave heating device, such as shown in the copending Hall and Gross application, Serial No. 721,540, filed January 11, 1947, is particularly suitable for the thawing and heating of such precooked frozen meals in the required time interval.

The next and final step in my method, therefore, is to subject the cooled or frozen food bodies or complete meals to microwave energy to thaw them if necessary, and to heat them to eating temperature. Such meals are the end result of either the selection and assembly of individually-wrapped portions on a dish, or the selection of a complete packaged meal for use.

When an oven type microwave heating apparatus or device of the type disclosed in the aforementioned Hall and Gross application is used for the final step in my method, it has been found, in accordance with the principles disclosed in the copending Welch application, Serial No. 722,052, filed January 14, 1947 now Patent No. 2,495,435, that it is not necessary, and is in fact undesirable, to remove the wrappers from the frozen food articles while they are being heated. Therefore, in said final step of my method of food preparation, it is necessary only to place the wrapped food portions, or the packaged preserved food meals, directly in the microwave oven, in order to subject them to microwave or radio-frequency energy to thaw them and bring them up to eating temperature.

It has been found that, with a microwave heating device, for example of the type disclosed in the said Hall and Gross application, a complete twelve-ounce frozen food meal, consisting of precooked meat and vegetables previously readied in a sectional dish, may be thawed or melted and brought to eating temperature in a time on the order of two minutes. At the end of this short time interval, the meal is ready to be eaten and may be served by removing the wrapper or wrappers therefrom.

It will be seen, from all of the above, that I have devised a very efficient, time-saving, and economical method of preparing or cooking individual portions of food on a commercial basis. Individual portions of food or individual meals may be maintained in storage for any desired length of time, even indefinitely, without spoilage, yet may be prepared for consumption, when desired, in a very short time.

My method may be very effectively employed to provide complete warm meals for great numbers of people in widely scattered locations at very low cost. The bulk foodstuffs may be precooked in a central commissary, where conditions can be accurately controlled and waste and spoilage kept to a minimum. Oven-type microwave-heating apparatus as disclosed, for example in the aforementioned Hall and Gross application, may be installed in each of a plurality of widely scattered restaurants, cafeterias, or other suitable consumer outlets. At this juncture it may be mentioned that the outlets may even be of the automatic coin-operated kind. The precooked food may then be treated in various manners. If it is to be consumed the same day or the next, after preparation and packaging, the food portions may be placed aboard a refrigerator truck, where it is not only cooled to a preservation temperature and so maintained until used, but also simultaneously transported to the outlet. The outlet is also equipped with suitable refrigeration apparatus, which preferably also displays at least sample food portions, so that preservation is maintained almost until the moment of actual consumption. On the other hand, a tremendous quantity of one or more particular foodstuffs may be precooked at one time at the commissary, for example, to take advantage of a seasonal low price of a particular commodity. This foodstuff is then frozen, as set forth above, and is preserved for an indefinite period of time until it is used.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. In a method of preparing food, the steps of precooking the raw foodstuff, freezing the precooked food, and subjecting the frozen precooked food to microwave energy to heat it to eating temperature.

2. In a method of preparing food in individual portions, the steps of precooking the raw foodstuff in large volumes, separating the cooked foodstuff into individual portions, freezing such portions, and thereafter subjecting such portions to microwave energy to heat them to eating temperature.

3. In a method of preparing food in individual portions, the steps of precooking the raw foodstuff in large volumes, separating the cooked foodstuff into individual portions, freezing such portions into individual patties, and thereafter subjecting such patties to microwave energy to heat them to eating temperature.

4. In a method of preparing food in individual portions, the steps of precooking the raw foodstuff in large volumes, separating the cooked foodstuff into individual portions, freezing such portions into individual patties, assembling a plurality of patties to provide a meal, and subjecting the assembled patties to microwave energy to heat them to eating temperature.

5. In a method of preparing food in individual portions, the steps of precooking the raw foodstuff in large volumes, separating the cooked foodstuff into individual portions, freezing such portions into individual patties, assembling a plurality of patties into a common container to provide a meal, wrapping said container, and subjecting the container and its contents to microwave energy to heat the contents to eating temperature.

6. In a method of preparing food, the steps of cooking the raw foodstuff, freezing the precooked food, and subjecting the frozen precooked food to microwave energy having a wave length on the order of thirty centimeters to thereby heat said food.

7. A method of heating frozen food comprising subjecting said frozen food to microwave energy having a wave length on the order of thirty centimeters to thereby heat said frozen food.

8. In a method of preparing food, the steps of precooking the raw foodstuff, cooling the precooked food to a preservation temperature, and subjecting the cooled precooked food to microwave energy to heat it to eating temperature.

9. In a method of preparing food, the steps of precooking the raw foodstuff, refrigerating the precooked food, and subjecting the refrigerated precooked food to microwave energy to heat it to eating temperature.

10. In a method of preparing food in individual portions, the steps of precooking the raw food stuff in large volumes, separating the precooked foodstuff into individual portions, refrigerating such portions, and thereafter subjecting such portions to microwave energy to heat them to eating temperature.

11. In a method of preparing food, the steps of precooking the raw foodstuff, cooling the precooked foodstuff to a preservation temperature, maintaining the cooled precooked foodstuff at said preservation temperature for a desired period of time, and at the end of said period of time subjecting the cooled precooked food to microwave energy to heat it to eating temperature.

LAURENCE K. MARSHALL.

No references cited.